United States Patent
Araki (10) Patent No.: US 8,861,734 B2
(45) Date of Patent: Oct. 14, 2014

(54) SECRET INFORMATION DISTRIBUTION SYSTEM, METHOD, PROGRAM, AND TRANSMISSION SYSTEM

(75) Inventor: Toshinori Araki, Tokyo (JP)

(73) Assignee: NEC Corporation, Tokyo (JP)

( * ) Notice: Subject to any disclaimer, the term of this patent is extended or adjusted under 35 U.S.C. 154(b) by 831 days.

(21) Appl. No.: 12/674,375

(22) PCT Filed: Aug. 13, 2008

(86) PCT No.: PCT/JP2008/064517
§ 371 (c)(1),
(2), (4) Date: Feb. 19, 2010

(87) PCT Pub. No.: WO2009/025220
PCT Pub. Date: Feb. 26, 2009

(65) Prior Publication Data
US 2011/0126291 A1    May 26, 2011

(30) Foreign Application Priority Data
Aug. 22, 2007    (JP) .................. 2007-215541

(51) Int. Cl.
*H04L 9/00* (2006.01)
*H04L 9/08* (2006.01)

(52) U.S. Cl.
CPC .................................... *H04L 9/085* (2013.01)
USPC .............................. 380/277; 380/278; 726/26

(58) Field of Classification Search
USPC ............ 380/28, 30, 277; 726/26–29; 713/171
See application file for complete search history.

(56) References Cited

U.S. PATENT DOCUMENTS 5,675,649 A *   10/1997   Brennan et al. ................ 380/286
2003/0115251 A1 *   6/2003   Fredrickson et al. ......... 709/201

FOREIGN PATENT DOCUMENTS

JP     2000-214774 A     8/2000

OTHER PUBLICATIONS

International Search Report for PCT/JP2008/064517, mailed Nov. 25, 2008.
W. Ogata et al., "Optimum Secret Sharing Scheme Secure Against Cheating", Siam J. Discrete Math., 2006, vol. 20, No. 1, pp. 79-95.
S. Obana et al., "Almost Optimum Secret Sharing Schemes Secure Against Cheating for Arbitrary Secret Distribution", ASIACRYPT 2006, LNCS 4284, pp. 364-379.
A. Shamir, "How to Share a Secret", Communications of the ACM, Nov. 1979, vol. 22, No. 11, pp. 612-613.
K. Kurosawa et al., "Almost Secure (1-Round, n-Channel) Message Transmission Scheme", Cryptology ePrint Archive, http://eprint.iacr.org/207/076.
D. Dolev et al., "Perfectly Secure Message Transmission", FOCS 1990, pp. 36-45.
R. McEliece et al., "On Sharing Secrets and Reed-Soloman Codes", Communications of the ACM, Sep. 1981, vol. 24, No. 9, pp. 583-584.

(Continued)

*Primary Examiner* — Kambiz Zand
*Assistant Examiner* — Suman Debnath
(74) *Attorney, Agent, or Firm* — Sughrue Mion, PLLC (57) ABSTRACT

A secret reconstruction method comprises: receiving (k+α) pairs out of n pairs ($r_i$, $f_i$) each composed of a random number $r_i$ and a share $f_i$ where α is a natural number (steps B1-B5); determining if a (k−1) degree polynomial g(x) is reconstructed that satisfies $f_i$=g($r_i$) for all received pairs (steps B5 and B6); and outputting g(0) as the secret if the polynomial is reconstructed and otherwise outputting a signal indicating that at least one of the received pairs is forged (steps B7 and B8).

13 Claims, 8 Drawing Sheets

(56) References Cited

OTHER PUBLICATIONS

T. Araki et al., "Efficient Secret Sharing Schemes Secure against Cheating based on Universal Hash Family", 2007 Symposium on Cryptography and Information Security, Jan. 23, 2007, 3D1-2, pp. 1-6.

T. Araki et al., "Fixing a Secret Sharing Scheme presented at ASIACRYPT2006", 2008 Symposium on Cryptography and Information Security, Jan. 22, 2008, 4F1-4, pp. 1-5.

T. Araki, "Efficient (k,n) Threshold Secret Sharing Schemes Secure Against Cheating from n-1 Cheaters", ACISP 2007, LNCS, Sep. 6, 2007 (received date), vol. 4586, pp. 133-142.

\* cited by examiner

SECRET INFORMATION DISTRIBUTION SYSTEM, METHOD, PROGRAM, AND TRANSMISSION SYSTEM

The present application is the National Phase of PCT/JP2008/064517, filed on Aug. 13, 2008, which claims priority from Japanese Patent Application 2007-215541 (filed on Aug. 22, 2007) the content of which is hereby incorporated in its entirety by reference into this specification.

TECHNICAL FIELD

The present invention relates to a secret information distribution system (termed "secret sharing system" hereinafter), method (may be termed "scheme"), and program, a secret reconstruction device, method, program, and a transmission system, and more particularly to a secret sharing system, method, and program, a secret reconstruction device, method, program, and a transmission system based on the threshold secret sharing scheme.

BACKGROUND ART

In storing a secret such as a password, personal information, and encryption key information, there is a threat of the loss or destruction, and a threat of the stealing, of the secret. The creation of a copy of a secret, though effective against loss, increases the threat of stealing.

To solve this problem, attention has been paid to the (k,n) threshold secret sharing scheme proposed by Shamir (Non-Patent Document 3).

In the (k, n) threshold secret sharing scheme, a secret is encoded into n shares where k is a threshold, and n is the number of divisions. This scheme is characterized in that a secret can be reconstructed by any k or more shares out of n shares, but not by (k−1) or fewer shares.

In the scheme described in Non-Patent Document 3, a finite field GF(p) for p that is a prime number or a power of a prime number is used as a data set of secrets, and random points $(x_1, f(x_1)), \ldots, (x_n, f(x_n))$ on a (k−1) degree polynomial f(x) on GF(p), which includes the secret S in a constant term, are generated as shares.

If k shares are given, the (k−1) degree polynomial f(x) may be reconstructed uniquely. In this case, the secret S may be reconstructed as the value of f(0), that is, as the value of the constant term of the function f(x).

In addition, because the (k−1) degree polynomial cannot be determined uniquely from (k−1) or fewer shares, the secret S is not leaked.

Therefore, when the (k, n) threshold secret sharing scheme is used, the secret is not leaked even if (k−1) or fewer shares are stolen, and the secret may be reconstructed even if up to (n−k) shares are destroyed.

Now, assume that shares have been created and assigned correctly in the (k, n) threshold secret sharing scheme. In this case, a user who wants to reconstruct the secret tries to collect the shares from other users having the shares.

However, not all other users who are requested to send shares always send the shares without forging them (in the description below, a user who is a participant of the secret sharing scheme and sends a forged share is called a cheater). The value reconstructed based on a forged share may be a value different from the original value of the secret.

It is therefore preferable to be able detect with a high probability that, among those used for reconstruction, there is a share that is forged in order to make the value of the reconstructed secret different from the original value.

To solve this problem, Non-Patent Documents 1 and 2 describe the following methods.

The method described in Non-Patent Document 1 is a (k,n) threshold secret sharing scheme and, if the cheating detection probability is (1−ϵ) and the secret is selected from a set of s elements, the shares form a set of about s/ϵ elements.

This scheme ensures security provided that the secret is selected according to the uniform distribution. This cheating detection scheme satisfies the condition described above even if up to (k−1) shares are forged when k shares are input.

Actually, however, the secret is not always selected according to the uniform distribution and so there is a need for a method not requiring this condition.

On the other hand, Non-Patent Document 2 proposes a scheme that is secure even when the secret is selected according to any distribution. This scheme is a (k, n) threshold secret sharing scheme and, if the cheating detection probability is (1−ϵ), the shares form a set of $s/\epsilon^2$ elements.

This cheating detection scheme satisfies the condition described above even if up to (k−1) shares are forged when k shares are input.

The secret sharing schemes described in Non-Patent Documents 1 and 2 are called a "cheating detectable secret sharing scheme". The two methods described above are a scheme in which exactly as many shares as thresholds are used to detect cheating.

Non-Patent Document 6 describes a method for detecting cheating using more shares than thresholds, and it is known that the scheme is very efficient. However, this method requires (k+2u) shares where u is the number of forged shares.

Several methods other than that described in Non-Patent Document 6 are also proposed as a scheme that uses more than k shares to detect cheating. However, those methods are designed not only for detecting cheating but also for special purposes, for example, for identifying altered shared information (may be termed "forged shares") and therefore they are not always efficient.

It is also known that a message transmission method may be configured using the "cheating detectable secret sharing scheme".

The message transmission method refers to a transmission method that, when there are n channels between a transmission device and a reception device, the following conditions are satisfied even if the information flowing through up to (k−1) channels is forged and there are cheaters who know the information: (1) the reception device can transmit, with extremely high probability, messages that the transmission device sends; (2) the reception device does not receive the value of a message other than that the transmission device sends; and (3) a cheater cannot estimate a message that the transmission device sends. In the description below, k is called the number of assumed cheating channels.

Such a message transmission method may or may not be configured depending upon the relation between the value of k and the value of n, and various schemes are proposed.

In the present invention, a one-round transmission scheme is assumed in which data may be sent from the transmission device to the reception device only once thorough n channels.

Non-Patent Document 5 describes a transmission method that is efficient when t=(k−1) and n≥3t+1.

Non-Patent Document 4 describes a transmission method for use when 3t+1>n≥2t+1 that is efficient when n=2t+1.

In addition, when n≥3t+1, the method described in Non-Patent Document 4 may be used, but the scheme described in Non-Patent Document 5 is more efficient.

Note that Non-Patent Document 4 describes that the message transmission method cannot be configured when 2t≥n.

The message transmission method described in Non-Patent Document 4 is as follows.

The transmission device generates the shares of a transmission message using the "cheating detectable secret sharing scheme" and sends the shares via channels.

The reception device reconstructs shares, sent via any k channels out of n channels, using the same secret sharing scheme as that of the transmission device and, if the values of all reconstructed messages are the same, outputs the value as the message sent by the transmission device.

That is, the amount of information flowing through each channel depends on the "cheating detectable secret sharing scheme" that is used.

Although transmission via channels has been described, the means that implements the channels may be any means that can separately send multiple pieces of data generated by the transmission device.

Non-Patent Document 1:
W. Ogata, K. Kurosawa, D. R. Stinson: "Optimum Secret Sharing Scheme Secure Against Cheating," SIAM J.Discrete Math., vol. 20, no. 1, p. 79-95(206)

Non-Patent Document 2:
S. Obana, T. Araki: "Almost Optimum Secret Sharing Schemes Secure Against Cheating for Arbitrary Secret Distribution," ASIACRYPT, p. 364-379(206)

Non-Patent Document 3:
A. Shamir: "How to share a secret," Communications of ACM, 22(11), p. 612-613(1979)

Non-Patent Document 4:
K. Kurosawa and K. Suzuki, "Almost Secure (1-Round, n-Channel) Message Transmission Scheme Cryptology ePrint Archive," http://eprint.iacr.org/207/076

Non-Patent Document 5:
Danny Dolev, Cynthia Dwork, Orli Waarts, Moti Yung: Perfectly Secure Message Transmission FOCS 1990: 36-45

Non-Patent Document 6: R. J. McEliece, D. V. Sarwate: "On Sharing Secrets and Reed-Solomon Codes," Comm.ACM, 24, p. 583-584(1981)

SUMMARY

The disclosures of Non-Patent Documents given above are hereby incorporated by reference into this specification. The following analysis is made by the inventor of the present invention.

One of the problems with the conventional "cheating detectable secret sharing scheme" is low efficiency because it requires the processing of many shares to detect cheating.

In view of the foregoing, it is an object of the present invention to provide a method that efficiently detects cheating on shared information (shares) based on a small amount of information on shares when a secret is reconstructed based on shares in the (k, n) threshold secret sharing scheme.

A secret reconstruction device according to a first aspect of the present invention is a secret reconstruction device that reconstructs a secret based on shares generated by a (k, n) threshold secret sharing scheme, said secret reconstruction device comprising:

a storage unit that stores n pairs $(r_i, f_i)$ each composed of a random number $r_i$ and a share $f_i$; and a cheating detection unit that reads $(k+\alpha)$ pairs $(r_i, f_i)$ from said storage unit where $\alpha$ is a natural number and determines if a $(k-1)$ degree polynomial $g(x)$ can be reconstructed that satisfies $f_i=g(r_i)$ for the read pairs.

The secret reconstruction device may further comprise a reception unit that receives $(k+\alpha)$ pairs out of n pairs $(r_i, f_i)$ each composed of a random number $r_i$ and a share $f_i$ where $\alpha$ is a natural number; and said cheating detection unit makes the determination for all received pairs and outputs $g(0)$ as the secret if the polynomial could be reconstructed, and otherwise outputs a signal indicating that at least one of the received pairs has been forged.

A secret reconstruction method according to a second aspect of the present invention is a secret reconstruction method comprising:

reconstructing a secret based on shares generated by a (k, n) threshold secret sharing scheme;

reading $(k+\alpha)$ pairs out of n pairs $(r_i, f_i)$, each composed of a random number $r_i$ and a share $f_i$, from a storage unit where $\alpha$ is a natural number; and determining if a $(k-1)$ degree polynomial $g(x)$ can be reconstructed that satisfies $f_i=g(r_i)$ for the read pairs.

The secret reconstruction scheme may further comprise:

receiving $(k+\alpha)$ pairs out of n pairs $(r_i, f_i)$ each composed of a random number $r_i$ and a share $f_i$ where $\alpha$ is a natural number;

making the determination for all received pairs; and outputting $g(0)$ as the secret if the polynomial could be reconstructed, and otherwise outputting a signal indicating that at least one of the received pairs has been forged.

A program according to a third aspect of the present invention is a program that causes a computer to execute:

reconstructing a secret based on shares generated by a (k, n) threshold secret sharing scheme, reading $(k+\alpha)$ pairs out of n pairs $(r_i, f_i)$, each composed of a random number $r_i$ and a share $f_i$, from a storage unit where $\alpha$ is a natural number; and determining if a $(k-1)$ degree polynomial $g(x)$ that satisfies $f_i=g(r_i)$ can be reconstructed for the read pairs.

The program may further cause the computer to execute:

receiving $(k+\alpha)$ pairs out of n pairs $(r_i, f_i)$ each composed of a random number $r_i$ and a share $f_i$ where $\alpha$ is a natural number;

making the determination for all received pairs; and outputting $g(0)$ as the secret if the polynomial could be reconstructed, and otherwise outputting a signal indicating that at least one of the received pairs has been forged.

Preferably, in a secret reconstruction device according to a first mode, the secret reconstruction device receives $(k+\alpha)$ pairs out of n pairs $(r_i, f_i)$ each composed of a random number $r_i$ and a share $f_i$ where $\alpha$ is a natural number, repeats, for all combinations generated by selecting $(k+\alpha)$ pairs out of n pairs, the determination for all received pairs and outputs $g(0)$ as the secret if values of $g(0)$ reconstructed for all the combinations are equal, and otherwise outputs a signal indicating that at least one of the received pairs has been forged.

Preferably, a secret sharing system according to a second mode is a secret sharing system that generates shares based on a (k, n) threshold secret sharing scheme and reconstructs a secret based on shares, said secret sharing system comprising:

a secret reconstruction device described above; and a share generation device that generates a predetermined $(k-1)$ degree polynomial $f(x)$ that includes a secret as a constant term, and generates and outputs n pairs $(r_i, f(r_i))$ each composed of a random number $r_i$ and a share $f(r_i)$.

Preferably, a transmission system according to a third mode is a transmission system comprising a transmission device that transmits a message and a reception device that receives a message, wherein said transmission device comprises a share generation device in the secret sharing system described above and transmits the message as the secret; and said reception device comprises a secret reconstruction device described above and receives a message as a secret reconstructed from the random numbers and the shares or detects that the message has been forged.

Preferably, a secret reconstruction scheme according to a fourth mode further comprises:

repeating said receiving and said making the determination for all combinations generated by selecting (k+α) pairs out of n pairs; and outputting g(0) as the secret if values of g(0) reconstructed for all the combinations are equal and otherwise outputting a signal indicating that at least one of the received pairs is forged.

Preferably, a secret sharing scheme according to a fifth mode is a secret sharing method that generates shares based on a (k, n) threshold secret sharing scheme and reconstructs a secret based on shares, said secret sharing method comprising:

generating a predetermined (k−1) degree polynomial f(x) that includes the secret as a constant term; and generating and outputting n pairs $(r_i, f(r_i))$ each composed of a random number $r_i$ and a share $f(r_i)$, said secret sharing method further comprising said receiving, said making the determination and said outputting or said receiving, said making the determination, said repeating, and said outputting according to said secret reconstruction method described above.

Preferably, a program according to a sixth mode further causes the computer to execute:

repeating said receiving and said making the determination for all combinations generated by selecting (k+α) pairs out of n pairs; and outputting g(0) as the secret if values of g(0) reconstructed for all the combinations are equal, and otherwise outputting a signal indicating that at least one of the received pairs has been forged.

Preferably, a program according to a seventh mode is a program that generates shares based on a (k, n) threshold secret sharing scheme and reconstructs a secret based on shares, said program causing a computer to execute:

generating a predetermined (k−1) degree polynomial f(x) that includes the secret as a constant term; and generating and outputting n pairs $(r_i, f(r_i))$ each composed of a random number $r_i$ and a share $f(r_i)$, said program further causing the computer to execute said receiving, said making the determination, and said outputting or said receiving, said making the determination, said repeating, and said outputting according to said program described above.

The secret reconstruction scheme of the present invention allows cheating, which has been made on shares, to be detected based on an amount of information on shares smaller than that in a conventional scheme.

Explanations of symbols are included in the following description.

PREFERRED MODES

A secret sharing system according to exemplary embodiments of the present invention will be described in detail below with reference to the drawings.

In the present invention, the scheme based on the (k−1) degree polynomial described in Non-Patent Document 3 is used as the (k,n) threshold secret sharing scheme. The disclosure of Non-Patent Document 3 is hereby incorporated by reference into this specification.

In the method described in Non-Patent Document 3, a finite field GF(p) for p that is a prime number or a power of a prime number is used as a data set of secrets, and random points $(x_1, f(x_1)), \ldots, (x_n, f(x_n))$ on a (k−1) degree polynomial f(x) on GF(p), which includes the secret S as the constant term, are generated as shares.

In the description below, assume that $x_i$ (i=1, . . . , n) is stored in each of the storage devices in which shares are stored and held.

$f(x_i)$ corresponding to $x_i$ is called the share for $x_i$.

Figure 1:
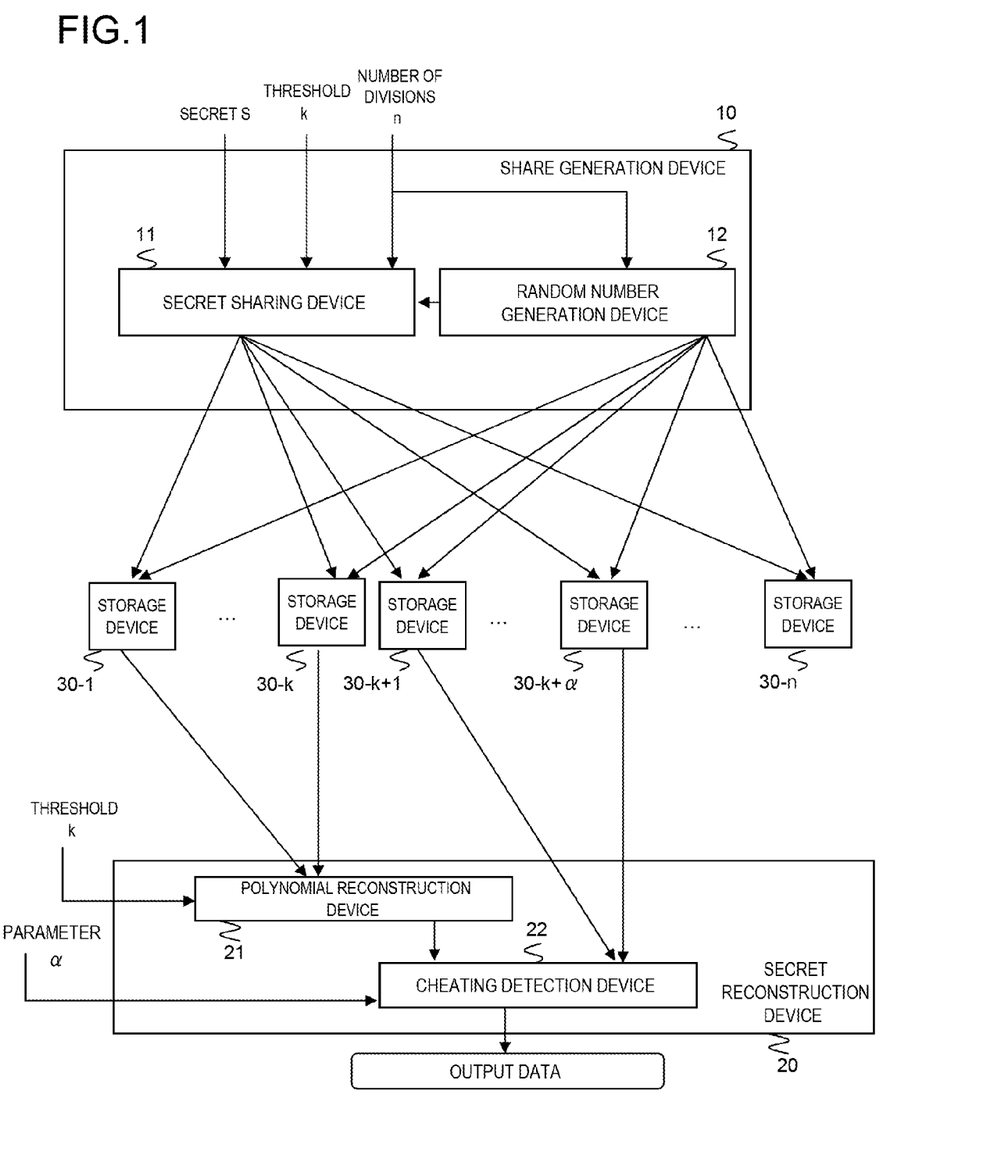
FIG. 1 is a block diagram showing a share generation system according to an exemplary embodiment of the present invention.

FIG. 1 is a block diagram showing the configuration of a secret sharing system according to an exemplary embodiment of the present invention.

Referring to FIG. 1, the secret sharing system according to an exemplary embodiment of the present invention is a system including a share generation device 10, a secret reconstruction device 20, and multiple storage devices 30-1 to 30-n.

The share generation device 10 receives a secret S, a threshold k, and the number of divisions n, generates and outputs a set of n random numbers that are different with each other (hereinafter called a random number set A), generates a (k−1) degree polynomial f having random coefficients and including S as the constant term, inputs each element of the random number set A into the polynomial f, and outputs a value.

From k storage devices out of (k+α) storage devices each of which stores an element of the random number set A and the share of the secret S corresponding to the element of the random number set A which are output by the share generation device 10, the secret reconstruction device 20 reads, from the storage devices, elements $r_1, \ldots, r_k$ of the random number set A and the shares $f_1, \ldots, f_k$ of the secret corresponding to each of those elements and calculates the (k−1) degree polynomial that passes through $(r_1, f_1), \ldots, (r_k, f_k)$. If $(r_{k+1}, f_{k+1}), \ldots, (r_{k+\alpha}, f_{k+\alpha})$ are the points on the reconstructed g(x) where $r_{k+1}, \ldots, r_{k+\alpha}$ are the elements of the random number set A recorded in the remaining α storage devices and $f_{k+1}, \ldots, f_{k+\alpha}$ are the shares corresponding to those elements, the secret reconstruction device 20 outputs g(0) as the secret S and otherwise outputs a signal indicating cheating detection.

The object of the present invention can be achieved by appropriately selecting the size of the random number set A based on the configuration described above.

The share generation device 10, which includes a secret sharing device 11 and a random number generation device 12, receives the secret S, the threshold k, and the number of divisions n, which are elements of the secret data set S, outputs the different elements of the random number data set RA to the storage devices 30-1 to 30-n and, at the same time, outputs the elements of the share data sets BS to the storage devices 30-1 to 30-n.

The random number generation device 12 receives n that indicates the number of divisions, outputs the different elements of the random number data set RA (an element of RA stored in 30-i(i=1, . . . , n) is represented as $r_i$) to the storage devices 30-1 to 30-n, and outputs $r_1, \ldots, r_n$ to the secret sharing device 11.

The secret sharing device 11 receives the secret S, the threshold k, and the number of divisions n, receives $r_1, \ldots, r_n$ from the random number generation device 12, generates a (k−1) degree polynomial f(x) for generating the shares from the secret S using the (k, n) threshold secret sharing scheme described in Non-Patent Document 3 and, at the same time, outputs shares $f(r_1)$-$f(r_n)$ to the storage devices 30-1 to 30-n, one for each. In the description below, the share $f(r_i)$ is abbreviated $f_i$.

The secret reconstruction device 20 includes a polynomial reconstruction device 21 and a cheating detection device 22.

The secret reconstruction device 20 receives the threshold k and the parameter α, receives the elements of the random number data set and the elements of the share data set BS from k+α storage devices 30, one for each, and outputs a signal indicating the secret S or cheating detection.

The polynomial reconstruction device 21 receives the threshold k, reads the elements of the random number data set and the elements of the share data set BS from k storage devices 30, and outputs the elements of the polynomial data set V.

The cheating detection device 22 receives the elements f of the polynomial data set V and the parameter α, reads the elements $t_1, \ldots, t_\alpha$ of the random number data set and the elements $g_1, \ldots, g_\alpha$ of the share data set BS from α storage devices 30 out of the storage devices 30-1 to 30-n. If $f(t_1)=g_1, \ldots, f(t_\alpha)=g_\alpha$ are all satisfied, the cheating detection device 22 outputs f(0) as the secret S and otherwise the cheating detection device 22 outputs a signal indicating cheating detection.

Next, a secret sharing system according to another exemplary embodiment of the present invention will be described in detail with reference to the drawings.

Figure 2:
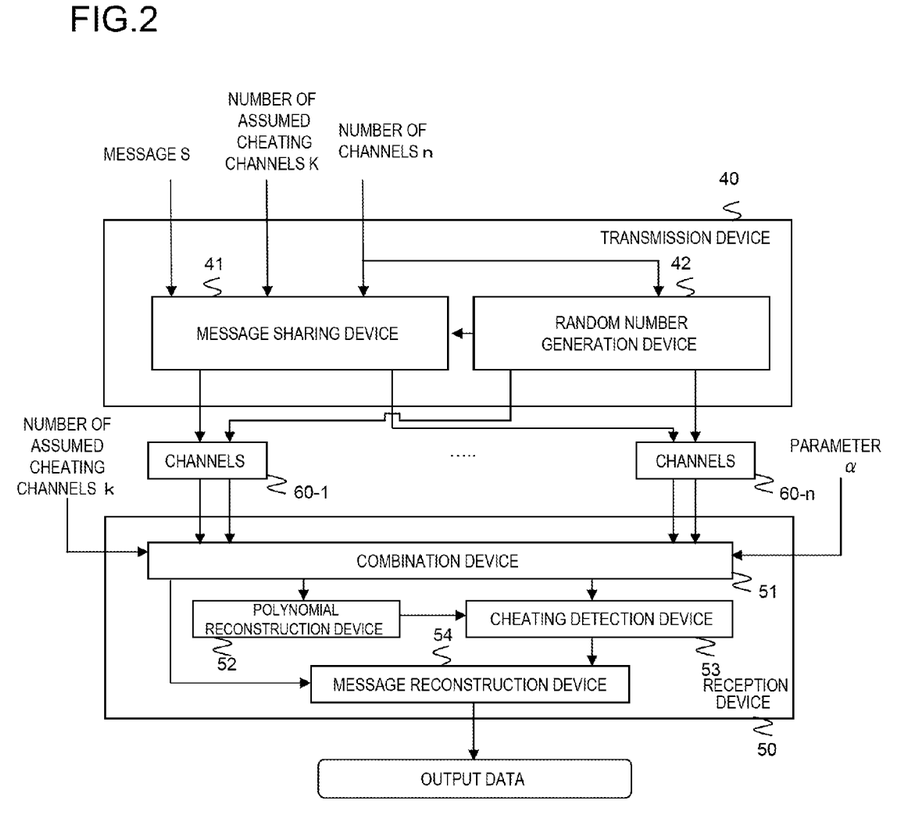
FIG. 2 is a block diagram showing a transmission system according to another exemplary embodiment of the present invention.

FIG. 2 is a block diagram showing the configuration of a transmission system according to another exemplary embodiment of the present invention.

Referring to FIG. 2, the transmission system includes a transmission device 40 and a reception device 50 connected via n channels 60-1 to 60-n.

The transmission device 40 receives a transmission message S, the number of channels n, and the number of assumed cheating channels k (assume that 3t+1>n>2t+1 is satisfied when k=t+1). The transmission device 40 inputs the secret S, the number of divisions n, and the threshold k into the share generation device 10 of the secret sharing system of the present invention, respectively. And, the transmission device 40 sends sets, each composed an element of the random number set generated by the share generation device 10 and an output generated by inputting the element into the polynomial which is generated by the share generation device and which includes S as the constant term, to the reception device 50 via the channels 60-1 to 60-n.

The reception device 50 receives the information, received via the n channels 60-1 to 60-n, as an input. If the values of messages reconstructed based on the information sent via the sets of any k+α channels out of n channels are the same value, the reception device 50 outputs the value as the message that the sender has sent.

Although n channels 60-1 to 60-n are used as an example in FIG. 2, the means that implements the channels need not be n channels but any means that can individually send multiple pieces of data, generated by the transmission device 40 may be used.

The number of assumed cheating channels k represents the maximum allowable number of channels, whose information may be forged or eavesdropped, out of n sets of information generated by the transmission device.

In the description below, assume that the relation 3t+1>n≥2t+1+α is satisfied where t=k−1.

The following describes the configuration of the transmission device 40 with reference to FIG. 2.

The transmission device 40 includes a message sharing device and a random number generation device 42. The transmission device 40 receives a message S that is an element of the message data set M, the number of assumed cheating channels k, and the number of channels n, inputs different elements of the random number data set RA into the channels 60-1 to 60-n, and inputs the elements of the sharing message data set BS into the channels 60-1 to 60-n.

The random number generation device 42 receives n that represents the number of channels, inputs different elements of the random number data set RA into the channels 60-1 to 60-n (an element of RA input to 60-i (i=1, . . . , n) is the element $r_i$), and outputs $r_1, r_2, \ldots, r_n$ to the message sharing device 41.

The message sharing device 41 receives an element S of the set M, the number of assumed cheating channels k, and the number of channels n and receives the random numbers $r_1, r_2, \ldots, r_n$ from the random number generation device 42. The message sharing device 41 generates a polynomial f that is used to generate shares for the message S using the (k, n) threshold secret sharing scheme described in Non-Patent Document 3, and outputs the shares $f(r_i)$ to the 60-i (i=1-n)

The channels 60-i receive $r_i$ and $f(r_i)$ from the transmission device 40 and, at the same time, output them to the reception device 50.

The reception device 50 includes a combination device 51, a polynomial reconstruction device 52, a cheating detection device 53, and a message reconstruction device 54.

The reception device 50 receives the number of assumed cheating channels k and the parameter α, receives the elements of the random number data set and the elements of the sharing message data set BS from the n channels 60-1 to 60-n, and outputs the elements of the message data set M or the signal indicating cheating detection.

The combination device 51 receives random numbers and sharing messages from n channels 60-1 to 60-n, receives the number of assumed cheating channels k and the parameter α, and receives the signal, which requests the reception of the next combination, from the message reconstruction device 54. The combination device 51 outputs the input from k channels out of a combination of (k+α) channels selected from n channels to the polynomial reconstruction device 52, and the input from the remaining α channels to the cheating detection device 53. In addition, the combination device 51 outputs a signal that indicates that the output of all combinations generated by selecting (k+α) channels from n channels has been completed, to the message reconstruction device 54.

The polynomial reconstruction device 52 receives the output of the combination device 51 and outputs the elements of the polynomial data set V.

The cheating detection device 53 receives the output of the combination device 51 and the elements f of the polynomial data set V. The cheating detection device 53 outputs f(0) to the message reconstruction device 54 if $f(t_i)=g_i$ is satisfied for all i (i=1−α) where $t_1$-$t_\alpha$ are elements of the random number data set input from the combination device 51 and $g_1$-$g_\alpha$ are the elements of the sharing message data set BS; if not, the cheating detection device 53 outputs the signal, which indicates cheating detection, to the message reconstruction device 54.

The message reconstruction device 54 receives the input from the cheating detection device 53 and receives the signal, which indicates that the output of all combinations is completed, from the combination device 51. If all the inputs except the symbol indicating cheating detection are equal, the message reconstruction device 54 outputs the value and otherwise outputs a symbol indicating cheating detection.

The share generation device 10 and the secret reconstruction device 20 in FIG. 1 and the transmission device 40 and the reception device 50 in FIG. 2 may be implemented, for example, by semiconductor integrated circuits such as an LSI (Large Scale Integration) or DSP (Digital Signal Processor) composed of logical circuits.

Figure 8:
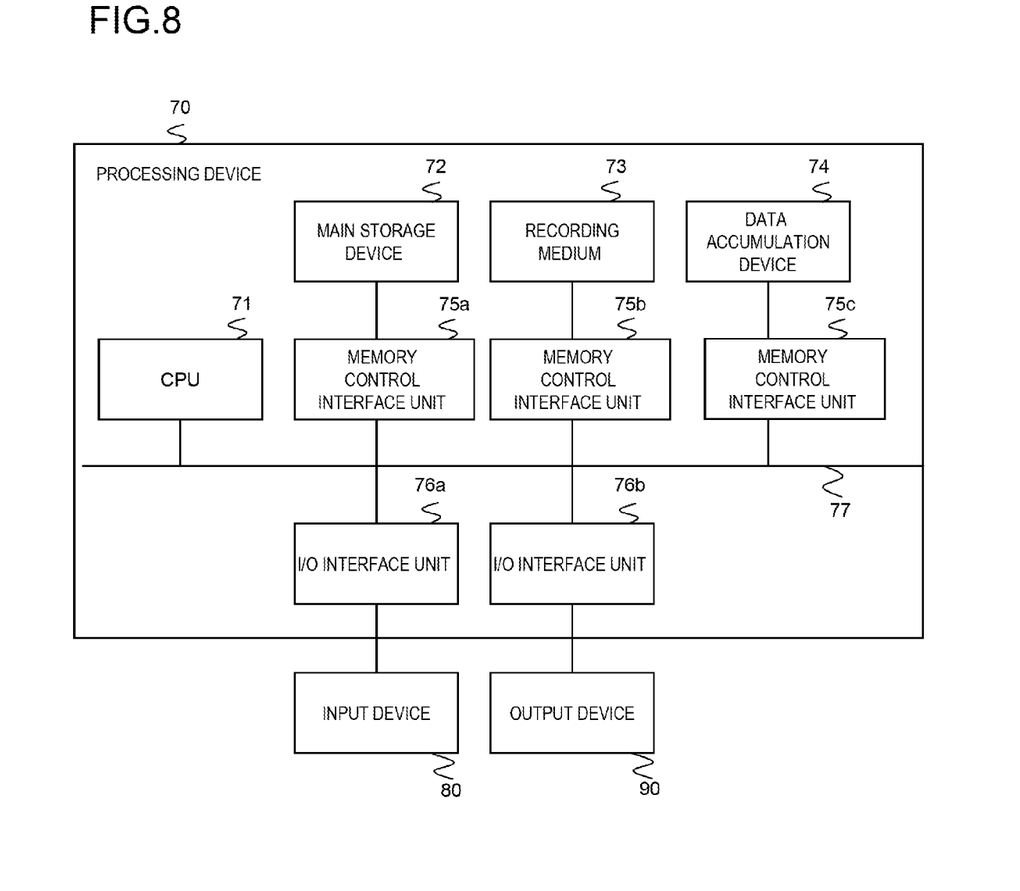
FIG. 8 is a block diagram showing a processing device provided in a share generation system according to an exemplary embodiment of the present invention or in a transmission system according to another embodiment.

On the other hand, the share generation device 10, secret reconstruction device 20, transmission device 40, and reception device 50 may be implemented, as shown in FIG. 8, by a computer including a processing device 70 that executes predetermined processing under program control, an input device 80 via which commands and information are input to the processing device 70, an output device 90 on which the processing result of the processing device 70 is displayed on the monitor screen.

Referring to FIG. 8, the processing device 70 comprises a CPU 71, a main storage device 72 that temporarily stores information necessary of the processing of the CPU 71, a recording medium 73 recording therein the programs, which will be described later, for causing the CPU 71 to execute the processing of the share generation device 10, secret reconstruction device 20, transmission device 40, and reception device 50, a data accumulation device 74 that stores secrets, thresholds, number of divisions, constant, etc., memory control interface units 75a-75c that control data transfer among the main storage device 72, recording medium 73, and data accumulation device 74, and I/O interface units 76a and 76b that are interface devices with the input device 80 and the output device 90. The units of the processing device 70 are interconnected via a bus 77.

The data accumulation device 74 need not be provided in the processing device 70, but may be provided alone externally to the processing device 70.

The processing device 70 implements the functions of the share generation device 10, secret reconstruction device 20, transmission device 40, and reception device 50, which will be described later, according to the programs recorded in the recording medium 73.

The recording medium 73 may be a magnetic disk, a semiconductor memory, an optical disc, and other recording media.

The channels 60-1 to 60-$n$ may be any means via which data is sent; for example, they may be optical fibers and telephone lines.

Figure 3:
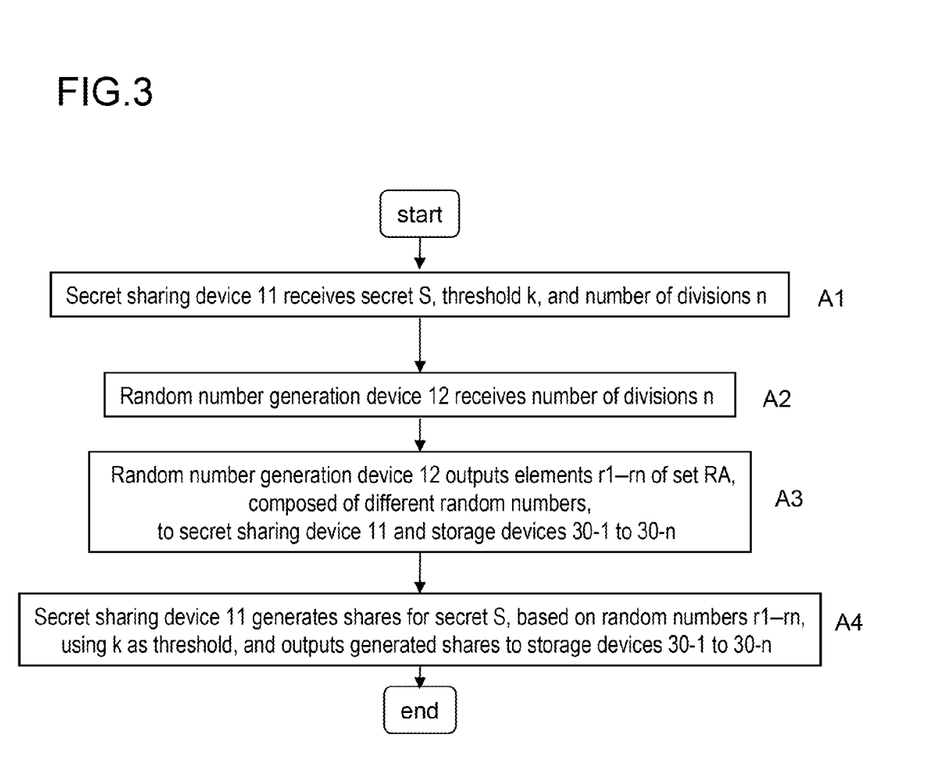
FIG. 3 is a flowchart showing an operation of a share generation device provided in the secret generation system according to an exemplary embodiment of the present invention.
Figure 4:
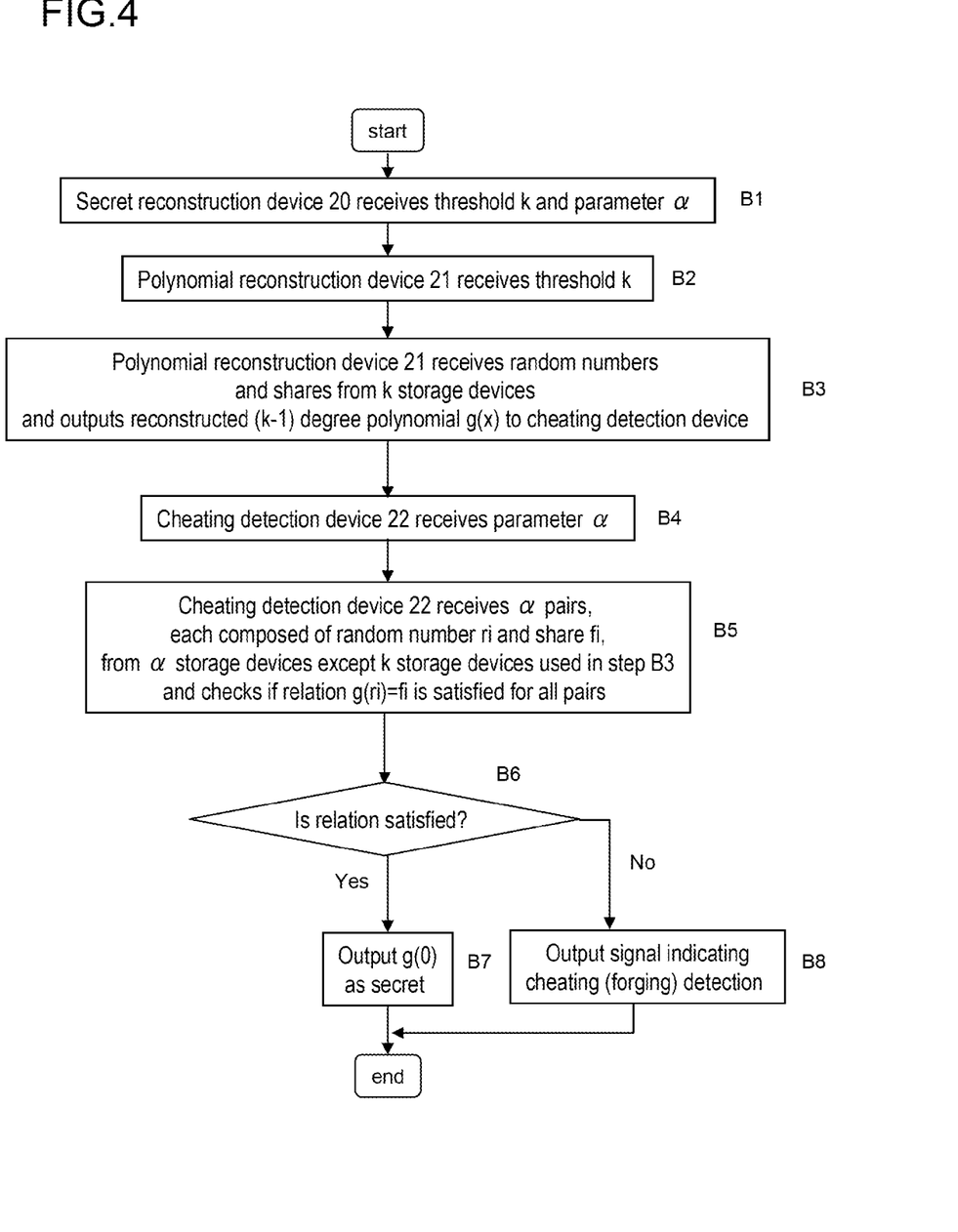
FIG. 4 is a flowchart showing an operation of a secret reconstruction device provided in a share generation system according to an exemplary embodiment of the present invention.

Next, the following describes the operation of the secret sharing system according to an exemplary embodiment of the present invention based on the flowcharts in FIG. 3 and FIG. 4.

FIG. 3 is a flowchart showing an operation of the share generation device 10 provided in the secret sharing system according to an exemplary embodiment of the present invention.

First, the secret sharing device 11 provided in the share generation device 10 receives a secret S, a threshold k, and the number of divisions n that are the elements of the secret data set (step A1).

The random number generation device 12 provided in the share generation device 10 receives the number of divisions n (step A2).

The random number generation device 12 outputs the elements $r_1$-$r_n$ of the set RA, composed of different random numbers, to the secret sharing device 11 and the storage devices 30-1 to 30-$n$ (step A3).

The secret sharing device 11 generates shares for the secret S, based on the random numbers $r_1$-$r_n$, using k as the threshold, and outputs the generated shares to the storage devices 30-1 to 30-$n$ (step A4).

FIG. 4 is a flowchart showing the operation of the secret reconstruction device 20 provided in the secret sharing system according to an exemplary embodiment of the present invention.

The secret reconstruction device 20 receives the threshold k and the parameter α (step B1).

The polynomial reconstruction device 21 receives the threshold k (step B2).

The polynomial reconstruction device 21 receives random numbers and shares from k storage devices and outputs the reconstructed (k−1) degree polynomial g(x) to the cheating detection device 22 (step B3).

The cheating detection device 22 receives the parameter α (step B4).

The cheating detection device 22 receives α pairs, each composed of the random number $r_i$ and the share $f_i$, from α storage devices except k storage devices used in step B3 and checks if the relation $g(r_i)=f_i$ is satisfied for all pairs (step B5).

If the relation is satisfied (Yes in step B6), the cheating detection device 22 outputs g(0) as the reconstructed secret (step B7); if the relation is not satisfied (No in step B6), the cheating detection device 22 outputs a signal indicating cheating (forging) detection (step B8).

Figure 5:
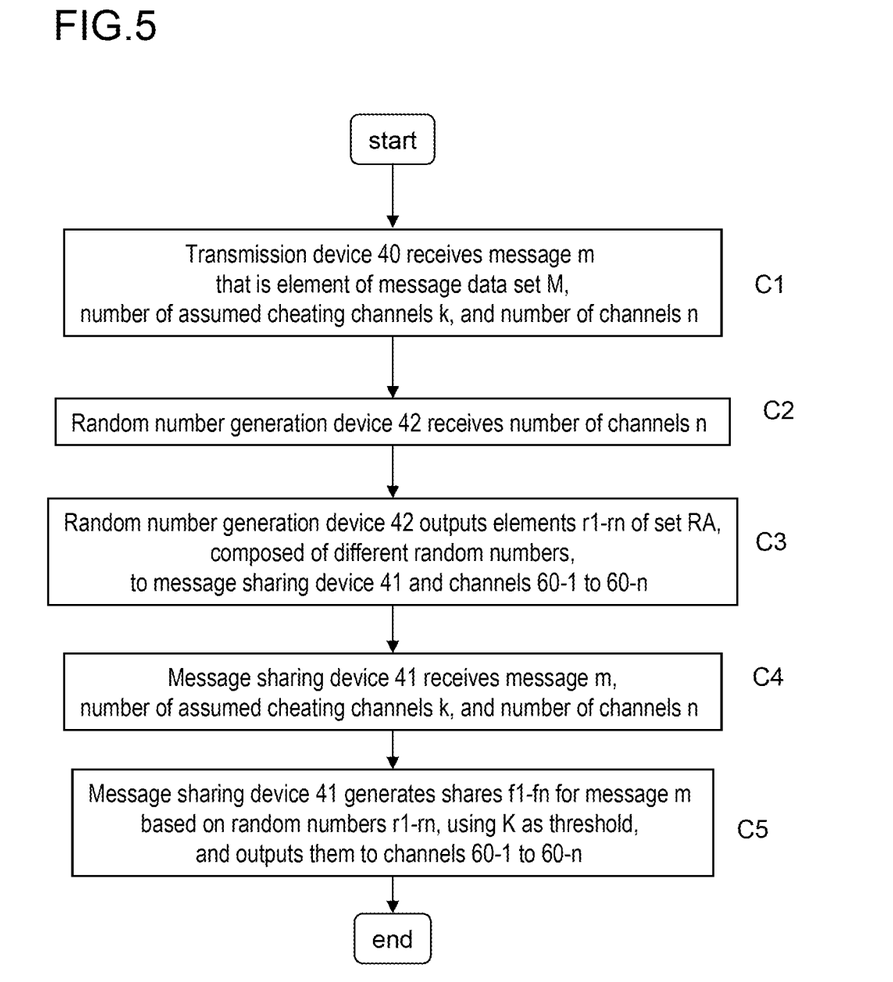
FIG. 5 is a flowchart showing an operation of a transmission device provided in a transmission system according to another exemplary embodiment of the present invention.
Figure 6:
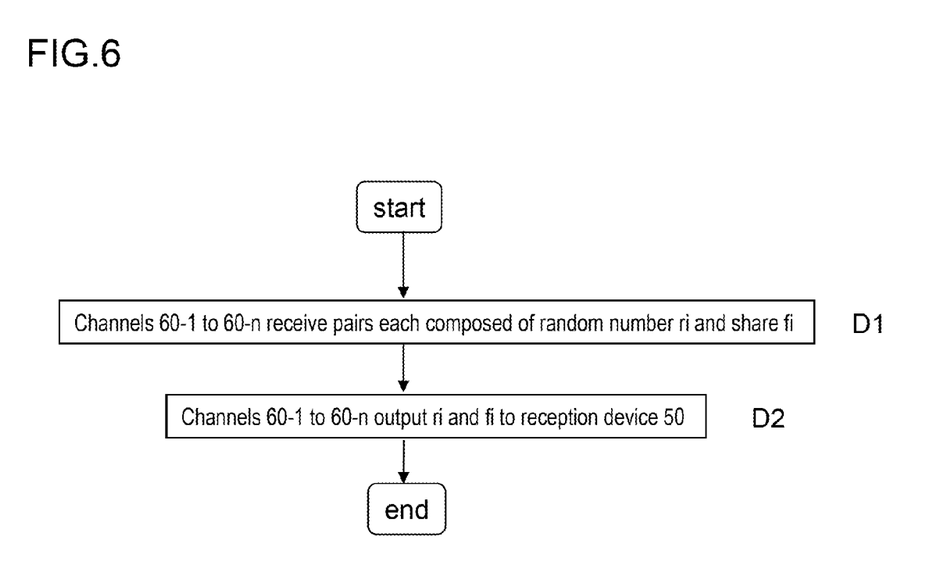
FIG. 6 is a flowchart showing an operation of cannels provided in a transmission system according to another exemplary embodiment of the present invention.
Figure 7:
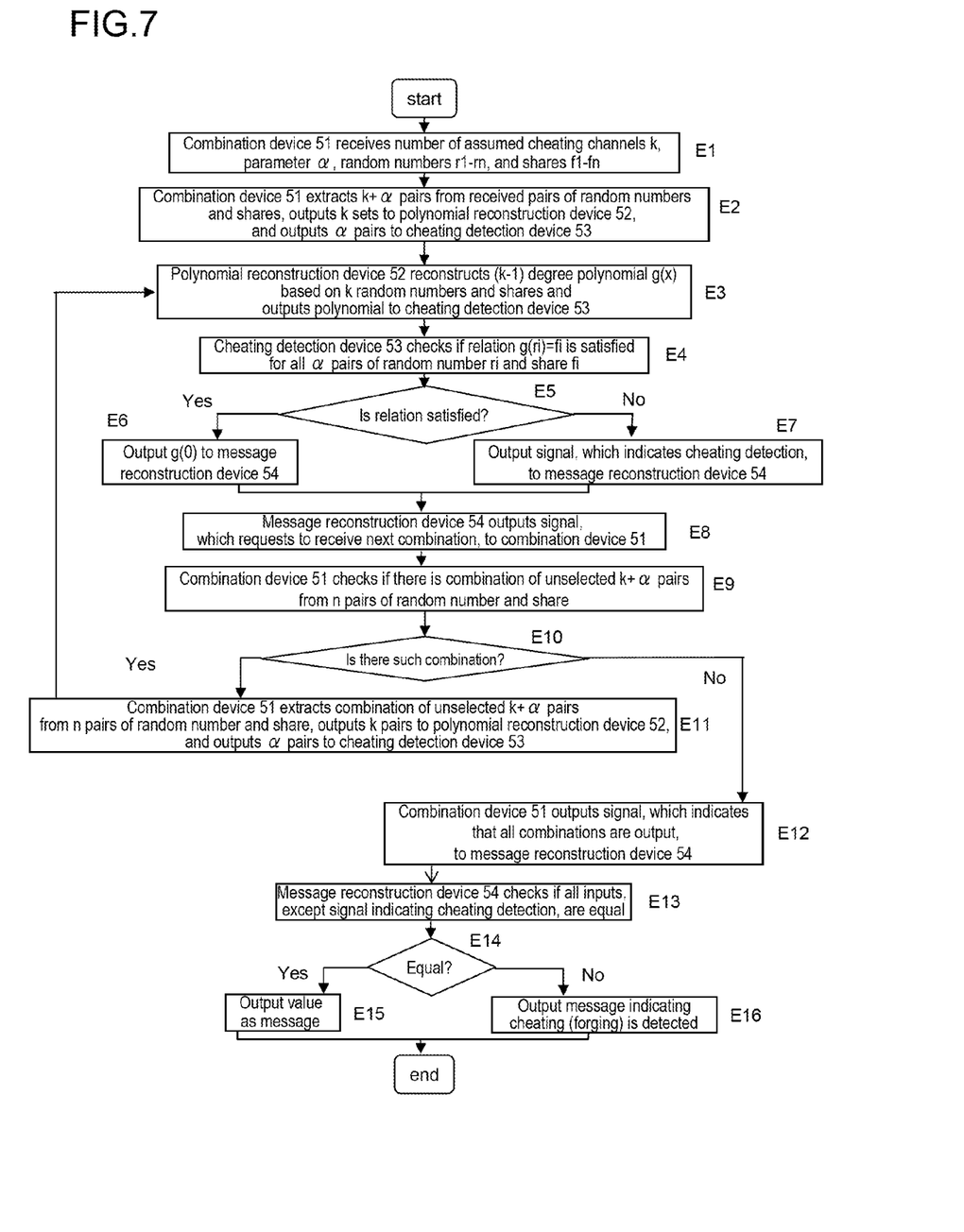
FIG. 7 is a flowchart showing an operation of a reception device provided in a transmission system according to another exemplary embodiment of the present invention.

Next, the following describes the operation of the transmission system according to another exemplary embodiment of the present invention with reference to the flowcharts in FIG. 5, FIG. 6, and FIG. 7.

FIG. 5 is a flowchart showing an operation of the transmission device 40 provided in the transmission system according to another exemplary embodiment of the present invention.

First, the transmission device 40 receives a message m that is an element of the message data set M, the number of assumed cheating channels k, and the number of channels n (step C1).

The random number generation device 42 provided in the message sharing device 41 receives the number of channels n (step C2).

The random number generation device 42 outputs the different elements $r_1$-$r_n$ of the random number data set RA to the message sharing device 41 and the channels 60-1 to 60-$n$ (step C3).

The message sharing device 41 receives a message m, the number of assumed cheating channels k, and the number of channels n (step C4).

The message sharing device 41 generates shares $f_1$-$f_n$ for the message m, based on the random numbers $r_1$-$r_n$, using k as the threshold, and outputs the generated shares to the channels 60-1 to 60-n (step C5).

FIG. 6 is a flowchart showing the operation of channels 60-i(i=1–n) provided in the transmission system according to another exemplary embodiment of the present invention.

The channels 60-i receive random numbers $r_i$ and shares $f_i$ (step D1) and output them to the reception device 50 (step D2).

FIG. 7 is a flowchart showing the operation of the reception device 50 provided in the transmission system according to another exemplary embodiment of the present invention.

The combination device 51 provided in the reception device 50 receives the number of assumed cheating channels k and the parameter α and receives random numbers $r_i$ and shares $f_i$(i=i–n) from n channels (step E1).

The combination device 51 extracts a combination of (k+α) pairs, $r_1$-$r_{k+\alpha}$ and $f_1$-$f_{k+\alpha}$, from n pairs of a random number and a share, outputs k sets of $r_1$-$r_k$ and $f_1$-$f_k$ to the polynomial reconstruction device 52, and outputs α sets of $r_{k+1}$-$r_{k+\alpha}$ and $f_{k+1}$-$f_{k+\alpha}$ to the cheating detection device 53 (step E2).

The polynomial reconstruction device 52 reconstructs a (k–1) degree polynomial g(x) based on k random numbers and shares and outputs the reconstructed polynomial to the cheating detection device 53 (step E3).

The cheating detection device 53 determines if the relation $g(r_i)=f_i$ (i=k+j; j=1–α) is satisfied for all α random numbers and shares (step E4).

If the relation is satisfied (Yes in step E5), the cheating detection device 53 outputs g(0) to message reconstruction device 54 (step E6); if the relation is not satisfied (No in step E5), the cheating detection device 53 outputs to the message reconstruction device 54 a signal that indicates cheating detection (step E7).

The message reconstruction device 54 outputs to the combination device 51 a signal that requests to receive the next combination (step E8).

The combination device 51 determines if there is a combination of unselected k+α pairs in n pairs of a random number and a share (step E9).

If there is a combination of unselected pairs (Yes in step E10), the combination device 51 extracts a combination of unselected k+α pairs from n pairs of a random number and a share, outputs k pairs to the polynomial reconstruction device 52, outputs α pairs to the cheating detection device 53 (step E11), and the process goes back to step E3.

On the other hand, if there is no combination of unselected pairs (No in step E10), the combination device 51 outputs to the message reconstruction device 54 a signal that indicates that all combinations are output (step E12).

The message reconstruction device 54 determines if all inputs, except the symbol indicating cheating detection, are equal (step E13).

If all inputs are equal (Yes in step E14), the message reconstruction device 54 outputs the value as the message (step E15) and otherwise outputs the signal that indicates cheating detection (step E16).

FIRST EXAMPLE

FIG. 1 is a block diagram showing a secret sharing system in a first example of the present invention.

In the first example, a finite field GF(p) is used for the data set of the secrets. GF(p) is a finite field for p that is a prime number or a power of a prime number.

Assume that the threshold k, the number of divisions n, and p satisfy the relation k≤n≤p–1.

FIG. 1 is a block diagram showing a share generation system in the first example of the present invention.

Referring to FIG. 1, the share generation device 10 receives the secret S, the threshold k, and the number of divisions n.

The random number generation device 12 provided in the share generation device 10 receives the number of divisions n.

The random number generation device 12 randomly selects different $r_1, \ldots, r_n$ from $1, \ldots, R_1(R_1 \leq p-1)$, outputs random numbers $r_i$ to the secret sharing device 11 and, at the same time, to the storage devices 30-i (i=1, ..., n).

The secret sharing device 11 provided in the share generation device 10 receives the secret S, the threshold k, and the number of divisions n.

The secret sharing device 11 generates a (k–1) degree polynomial that has a constant term on the finite field GF(p) as S and has the coefficients generated by the random numbers. This polynomial is represented as f(x). The secret sharing device 11 outputs f($r_i$) to the storage devices 30-i (i=1, ..., n).

Referring to FIG. 1, the secret reconstruction device 20 receives the threshold k and the parameter α.

The polynomial reconstruction device 21 provided in the secret reconstruction device 20 receives the threshold k. The polynomial reconstruction device 21 receives the random number $r_i$ and the share $f_i$ recorded in each of the storage devices 30-i. The polynomial reconstruction device 21 finds g(x) that is a (k–1) degree polynomial on the finite field GF(p) and that passes through points indicated by the coordinates ($r_i$, $f_i$) (i=1, ..., k) and outputs g(x), which was found, to the cheating detection device 22. The coefficients of the (k–1) degree polynomial can be determined uniquely by solving the linear simultaneous equations composed of k equations given, for example, by $g(r_i)=f_i$(i=1, ..., k).

The cheating detection device 22 provided in the secret reconstruction device 20 receives the parameter α. The cheating detection device 22 further receives the random numbers $r_i$ and the shares $f_i$ (i=k+1, ..., k+α) recorded in the storage devices 30-(k+j) (j=1, ..., α).

The cheating detection device 22 determines if the function g(x) given above satisfies $g(r_i)=f_i$ (i=k+1, ..., k+α).

If the relational expression given above is satisfied for all i (=k+1, ..., k+α), the cheating detection device 22 outputs g(0) as the secret. On the other hand, if the relational expression given above is not satisfied for at least one of i (=k+1, ..., k+α), the cheating detection device 22 outputs a signal indicating that cheating is detected.

The following describes that, in the first example, the size of the secret is p, the size of the share is $p*R_1$, and the cheating detection rate is 1–(p–1)(k–1)(k–2) ... (k–(1+α))/($R_1$–(k–1))($R_1$–k) ... ($R_1$–(k+α–1)).

Assume that the secret is any one of the values 0, ..., p–1.

The method according to the first example of the present invention is that (1) a (k–1) degree polynomial f on mode p that has a secret as the constant term is generated, (2) random values ($r_1, \ldots, r_n$) are allocated to shares, one for each, and (3) ($r_1$, f($r_1$)), ..., ($r_n$, f($r_n$)) are the shares.

In this method, (k+α) or more shares are collected, the secret is reconstructed, and the validity of the reconstructed secret is verified as described below. After that, f is reconstructed using k shares and, if the remaining α shares pass through f, it is determined that there is no cheating and the constant term of f is output.

In this scheme, assume that cheaters who know $(r_1, f(r_1)), \ldots, (r_{k-1}, f(r_{k-1}))$ try to cheat participants who have $(r_k, f(r_k)), (r_{k+1}, f(r_{k+1})), \ldots, (r_{k+\alpha}, f(r_{k+\alpha}))$. Assume that the cheaters do not know $(r_k, f(r_k)), (r_{k+1}, f(r_{k+1})), \ldots, (r_{k+\alpha}, f(r_{k+\alpha}))$.

Now, assume that the cheaters forge $(r_1, f(r_1)), \ldots, (r_{k-1}, f(r_{k-1}))$ and input $(r_1', f_1'), \ldots, (r_{k-1}', f_{k-1}')$ to the secret reconstruction device 20.

If the polynomial reconstructed using the points $(r_1', f_1'), \ldots, (r_{k-1}', f_{k-1}')$ and $(r_k, f(r_k))$ passes through the points $(r_{k+1}, f(r_{k+1})), \ldots, (r_{k+\alpha}, f(r_{k+\alpha}))$ and if the value of the constant term $f(0)$ of f is one of the values $0, \ldots, p-1$ other than the secret given above, cheating succeeds.

Assume that s' is one of the values $0, \ldots, p-1$ other than the secret and that f' is a polynomial reconstructed by $(r_1', f_1'), \ldots, (r_{k-1}', f_{k-1}')$ and $(0, s')$. Then, because f' is a $(k-1)$ degree polynomial other than f, the number of intersection points between f and f' is at most $(k-1)$.

Therefore, if all $(r_k, f(r_k)), (r_{k-1}, f(r_{k+1})), \ldots, (r_{k+\alpha}, f(r_{k+\alpha}))$ are points on f', s' is reconstructed by reconstructing the secret using $(r_1', f_1'), \ldots, (r_{k-1}', f_{k-1}'), (r_k, f(r_k)), (r_{k+1}, f(r_{k+1})), \ldots, (r_{k+\alpha}, f(r_{k+\alpha}))$.

Because different values are selected randomly for $r_k, r_{k+1}, \ldots, r_{(k+\alpha)}$, the probability with which s' is reconstructed is $(k-1)(k-2) \ldots (k-(1+\alpha))/(R_1-(k-1))(R_1-k) \ldots (R_1-(k+\alpha-1))$ at the highest if $r_1, r_2, \ldots, r_{(k+\alpha)}$ are selected from $0, \ldots, R_1$.

There are $(p-1)$ values other than the secret, the successful cheating probability is calculated by multiplying the expression given above by $(p-1)$, that is, $(k-1)(k-2) \ldots (k-(1+\alpha))/(R_1-(k-1))(R_1-(k)) \ldots (R_1-(k+\alpha-1))$.

Next, the following compares the secret reconstruction method in this example with the conventional method.

The size of the share in the scheme described in Non-Patent Document 1 is $s/\epsilon$ where s is the size of the secret and $(1-\epsilon)$ is the cheating detection rate. The disclosure of Non-Patent Document 1 is hereby incorporated by reference into this specification.

On the other hand, the size of the share in the scheme described in Non-Patent Document 2 is $s/\epsilon^2$ where s is the size of the secret and $(1-\epsilon)$ is the cheating detection rate. The disclosure of Non-Patent Document 2 is hereby incorporated by reference into this specification.

The following describes more in detail the size when $k=2$, $\alpha=2$, $p=2^{40}$, and $\epsilon=1:2^{80}$.

The size of the share in this example is about $2^{80}$ when $\alpha=2$.

On the other hand, the sizes of the share in the methods described in Non-Patent Document 1 and Non-Patent Document 2 are $2^{120}$ and $2^{200}$ respectively.

This comparison indicates that the share in the secret reconstruction method in this example is smaller than the share in the methods in Non-Patent Document 1 and Non-Patent Document 2, thus resulting in efficient cheating detection.

SECOND EXAMPLE

The following describes in detail a transmission system in a second example of the present invention with reference to the drawings.

In the second example, a finite field GF(p) is used for the data set of messages. GF(p) is a finite field for p that is a prime number or a power of a prime number.

Assume that the number of assumed cheating channels k, the number of channels n, and the parameters $\alpha$ and p satisfy $2t+\alpha+1=n$ and $n \leq p-1$ when $t=k-1$.

Referring to FIG. 2, the transmission device 40 receives the number of assumed cheating channels k, the number of channels n, and a message S.

The random number generation device 42 provided in the transmission device 40 receives the number of channels n. The random number generation device 42 randomly selects different $r_1, r_2, \ldots, r_n$ from $1, 2, \ldots, R_1 (R_1 \leq p-1)$ and outputs $r_i$ ($i=1, \ldots, n$) to the message sharing device 41 and to the channels 60-i.

The message sharing device 41, provided in the transmission device 40, receives the message S, the number of assumed cheating channels k, and the number of channels n. The message sharing device 41 randomly generates a $(k-1)$ degree polynomial with the constant term on the finite field GF(p) as S. This polynomial is represented as $f(x)$. The message sharing device 41 outputs $f(r_i)$ ($i=1, \ldots, n$) to the channels 60-i.

The channels 60-i receive the random number $r_i$ and the share $f(r_i)$ from the transmission device 40 and output them to the reception device 50 ($i=1, \ldots, n$).

The reception device 50 receives the number of assumed cheating channels k and the parameter $\alpha$ and receives $r_i$ and $f(r_i)$ from channels 60-i ($i=1, \ldots, n$).

The combination device 51 provided in the reception device 50 receives the number of assumed cheating channels k, parameter $\alpha$, random numbers $r_i$, and shares $f(r_i)$ ($i=1, \ldots, n$).

The combination device 51 sequentially performs the following processing for all combinations generated by extracting $(k+\alpha)$ integers from a set of n integers, 1 to n.

Assume that the combination to note is the $(k+\alpha)$ integers, $i(1), \ldots, i(k+\alpha)$. In this case, the combination device 51 outputs $r_{i(1)}, \ldots, r_{i(k)}$ and $f_{i(1)}, \ldots, f_{i(k)}$ to the polynomial reconstruction device 52, and the remaining $r_{i(k+1)}, \ldots, r_{i(k+\alpha)}$ and $f_{i(k+1)}, \ldots, f_{i(k+\alpha)}$ to the cheating detection device 53.

The polynomial reconstruction device 52 finds a $(k-1)$ degree polynomial $g(x)$ on GF(p) passing through the coordinates $(r_{i(1)}, f_{i(1)}), \ldots, (r_{i(k)}, f_{i(k)})$ and outputs it to the cheating detection device 53.

The cheating detection device 53 determines if $g(r_{i(k+1)})=f_{i(k+1)}, \ldots, g(r_{i(k+\alpha)})=f_{i(k-\alpha)}$ is satisfied. If the relation is satisfied, the cheating detection device 53 outputs $g(0)$ to the message reconstruction device 54. On the other hand, if the relation is not satisfied, the cheating detection device 53 outputs to the message reconstruction device 54 a signal that indicates cheating detection.

If the values of output from the cheating detection device 53, except the signal indicating cheating detection, are all equal, the message reconstruction device 54 outputs the value and otherwise outputs the signal indicating cheating detection.

As shown below, the size of message information in the second example is $p*R_1$, and the cheating detection rate is $1-(p-1)(k-1)(k-2) \ldots (k-(1+\alpha))/(R_1-(k-1))(R_1-k) \ldots (R_1-(k+\alpha-1))$.

Assume that the secret (that is, message) is one of values $0, \ldots, p-1$.

In this example, the information sent via each unit channel is equivalent to the information stored in a storage device in the secret sharing system in the first example described above, and the size of the information is $p*R_1$.

The number of channels whose information may be forged by a cheater is the number generated by subtracting 1 from the number of assumed cheating channels k, that is, $(k-1)$.

In other words, the information flowing through $(\alpha+1)$ channels is not forged.

For the information flowing through all (k+α) channels, the processing of the reception device is equivalent to the reconstruction processing of the secret sharing system in the first example, and a valid message is reconstructed from the (k+α) channels that are not forged.

Even the (k+α) channels that include channels whose information is forged include the information of at least (α+1) channels that is not forged.

Therefore, cheating may be detected with the probability $1-(p-1)(k-1)(k-2)\ldots(k-(1+\alpha))/(R_1-(k-1))(R_1-k)\ldots(R_1-(k+\alpha-1))$.

When the number of sets of k+α channels including forged information is A, the probability with which all sets of k+α channels including forged information are detected is $1-A(p-1)(k-1)(k-2)\ldots(k-(1+\alpha))/(R_1-(k-1))(R_1-k)\ldots(R_1-(k+\alpha-1))$.

In the transmission system in this example, if a set of (k+α) channels including forged information cannot be detected and a value different from the original message is reconstructed from that set, a value different from the correct value is reconstructed and, if multiple values are reconstructed, the message transmission is determined to be failed and so a different reconstructed value is not recognized as the correct value.

When the method in Non-Patent Document 1 is applied to the method in Non-Patent Document 4, the size of information sent via each channel is s/ϵ where the size of the secret is s and the cheating detection rate is (1−ϵ).

On the other hand, when the scheme in Non-Patent Document 2 is applied to the method in Non-Patent Document 4, the size of information sent via each channel is $s/\epsilon^2$ where the size of the secret is s and the cheating detection rate is (1−ϵ).

When k=2, α=2, p=$2^{40}$, and ϵ=1;$2^{80}$, the size of the share in the transmission system in this example is about $2^{80}$. On the other hand, the sizes of the information sent via each channel in the methods described in Non-Patent Document 1 and Non-Patent Document 2 are about $2^{120}$ and $2^{200}$ respectively.

This comparison indicates that the share in the transmission system in this example is smaller than the share in the methods in Non-Patent Document 1 and Non-Patent Document 2.

Although multiple channels are used as an example in the description above, multiple channels need not always be used but any means may be used that can divide multiple pieces of data, generated by the transmission device 40, and send them to the combination device 51.

Although the above description is based on the examples, the present invention is not limited to the examples given above.

While the present invention has been described with reference to the embodiments above, it is to be understood that the present invention is not limited to the configuration of the embodiments above and that modifications and changes that may be made by those skilled in the art within the scope of the present invention are included.

The present invention includes the following modes.

(Mode 14) A secret reconstruction device that receives (k+α) pairs ($r_i$, $f_i$) each composed of a random number $r_i$ and a share $f_i$ where α is a natural number, determines if a (k−1) degree polynomial g that satisfies $f_i=g(r_i)$ can be reconstructed and, if the polynomial could not be reconstructed, outputs a signal indicating that at least one of the received pairs has been forged.

(Mode 15) The secret reconstruction device as defined in mode 14, wherein the share $f_i$ is generated by a (k, n) threshold secret sharing scheme using the random number $r_i$.

(Mode 16) The secret reconstruction device as defined in mode 14 or 15, wherein said secret reconstruction device performs the determination and, if the polynomial could be reconstructed, outputs g(0) as a secret.

(Mode 17) A secret reconstruction device that receives n pairs ($r_i$, $f_i$) each composed of a random number $r_i$ and a share $f_i$, determines if a (k−1) degree polynomial g that satisfies $f_i=g(r_i)$ can be reconstructed for all combinations generated by selecting (k+α) pairs where α is a natural number and (k+α) is not greater than n, outputs g(0) if g(0) is equal for all reconstructed combinations, and otherwise outputs a signal indicating that at least one of the received pairs has been forged.

(Mode 18) A secret sharing system comprising:
a secret reconstruction device as defined in any one of modes 14-16; and
a share generation device that receives a secret, generates a predetermined (k−1) degree polynomial f(x) which includes the secret as a constant term, and generates and outputs n pairs ($r_i$, f($r_i$)) each composed of a random number $r_i$ and a share f($r_i$).

(Mode 19) A transmission system including a transmission device that transmits a message and a reception device that receives a message, wherein
said transmission device comprises the share generation device provided in the secret sharing system as defined in mode 18, receives the message as an input for the share generation device, and transmits n sets of ($r_i$, $f_i$) output from the share generation device, each composed of a random number $r_i$ and a share $f_i$; and
said reception device comprises the secret reconstruction device as defined in any one of modes 14-17, inputs sets of $r_i$ and $f_i$, which are the output of said transmission device, into said secret reconstruction device and, if an output of the secret reconstruction device is the secret, outputs the secret as the message and otherwise detects that the message has been forged.

(Mode 20) A secret reconstruction method comprising:
receiving (k+α) pairs ($r_i$, $f_i$) each composed of a random number $r_i$ and a share $f_i$ where α is a natural number; and
determining if a (k−1) degree polynomial g can be reconstructed that satisfies $f_i=g(r_i)$ and, if the polynomial could not be reconstructed, outputting a signal indicating that at least one of the received pairs has been forged.

(Mode 21) A program causing a computer to execute:
receiving (k+α) pairs ($r_i$, $f_i$) each composed of a random number $r_i$ and a share $f_i$ where α is a natural number; and
determining if a (k−1) degree polynomial g can be reconstructed that satisfies $f_i=g(r_i)$ and, if the polynomial could not be reconstructed, outputting a signal indicating that at least one of the received pairs has been forged.

What is claimed is:

1. A secret reconstruction device that reconstructs a secret based on shares generated by a (k, n) threshold secret sharing scheme where k and n are integers and n is greater than k, said secret reconstruction device comprising:
a storage unit that stores n pairs ($r_i$, $f_i$), (i=1, . . . n), each composed of a random number $r_i$ and a share $f_i$; and
a cheating detection unit that reads (k+α) pairs ($r_i$, $f_i$) from said storage unit where α is a natural number and determines if a (k−1)-degree polynomial g(x), where x is an argument of the polynomial g, can be reconstructed that satisfies $f_i=g(r_i)$ for the read pairs.

2. The secret reconstruction device as defined in claim 1, wherein
said secret reconstruction device further comprises a reception unit that receives (k+α) pairs out of n pairs ($r_i$, $f_i$) each composed of a random number $r_i$ and a share $f_i$ where $\alpha$ is a natural number; and said cheating detection unit makes the determination for all received pairs and outputs g(0) as the secret if the polynomial could be reconstructed, and otherwise outputs a signal indicating that at least one of the received pairs has been forged.

3. The secret reconstruction device as defined in claim 1, wherein said secret reconstruction device receives (k+α) pairs out of n pairs ($r_i$, $f_i$) each composed of a random number $r_i$ and a share $f_i$ where α is a natural number, repeats, for all combinations generated by selecting (k+α) pairs out of n pairs, the determination for all received pairs and outputs g(0) as the secret if values of g(0) reconstructed for all the combinations are equal and otherwise outputs a signal indicating that at least one of the received pairs has been forged.

4. A secret sharing system that generates shares based on a (k, n) threshold secret sharing scheme and reconstructs a secret based on shares, said secret sharing system comprising:

a secret reconstruction device as defined in claim 1; and
a share generation device that generates a predetermined (k−1)-degree polynomial f(x) that includes a secret as a constant term, and generates and outputs n pairs ($r_i$, f($r_i$)) each composed of a random number $r_i$ and a share f($r_i$).

5. A transmission system comprising a transmission device that transmits a message and a reception device that receives a message, wherein said transmission device comprises a share generation device that generates a predetermined (k−1)-degree polynomial f(x) that includes a secret as a constant term, and generates and outputs n pairs ($r_i$, f($r_i$)) each composed of a random number $r_i$ and a share f($r_i$), and transmits the message as the secret; and said reception device comprises a secret reconstruction device as defined in claim 1 and receives a message as a secret reconstructed from the random numbers and the shares or detects that the message has been forged.

6. A secret reconstruction method comprising:

reconstructing, by a computer, a secret based on shares generated by a (k, n) threshold secret sharing scheme where k and n are integers and n is greater than k:

reading (k+α) pairs out of n pairs ($r_i$, $f_i$), (i=1, . . . n), each composed of a random number $r_i$ and a share $f_i$, from a storage unit where α is a natural number; and determining if a (k−1)-degree polynomial g(x), where x is an argument of the polynomial g, can be reconstructed that satisfies $f_i$=g($r_i$) for the read pairs.

7. The secret reconstruction method as defined in claim 6, further comprising:

receiving (k+α) pairs out of n pairs ($r_i$, $f_i$) each composed of a random number $r_i$ and a share $f_i$ where α is a natural number;

making the determination for all received pairs; and
outputting g(0) as the secret if the polynomial could be reconstructed, and otherwise outputting a signal indicating that at least one of the received pairs has been forged.

8. The secret reconstruction method as defined in claim 7, further comprising:

repeating said receiving and said making the determination for all combinations generated by selecting (k+α) pairs out of n pairs; and outputting g(0) as the secret if values of g(0) reconstructed for all the combinations are equal, and otherwise outputting a signal indicating that at least one of the received pairs has been forged.

9. The secret sharing method that generates shares based on a (k, n) threshold secret sharing scheme and reconstructs a secret based on shares, said secret sharing method comprising:

generating a predetermined ((k−1)-degree polynomial f(x) that includes the secret as a constant term; and generating and outputting n pairs ($r_i$, f($r_i$)) each composed of a random number $r_i$ and a share f($r_i$), said secret sharing method further comprising said receiving, said making the determination, and said outputting or said receiving, said making the determination, said repeating, and said outputting according to said secret reconstruction method as defined in claim 7.

10. A non-transitory computer-readable storage medium storing a program that causes a computer to execute:

reconstructing a secret based on shares generated by a (k, n) threshold secret sharing scheme where k and n are integers and n is greater than k, reading (k+α) pairs out of n pairs $r_i$, $f_i$), (i=1, . . . n), each composed of a random number $r_i$ and a share $f_i$, from a storage unit where α is a natural number; and determining if a (k−1)-degree polynomial g(x), where x is an argument of the polynomial g, that satisfies $f_i$=g($r_i$) can be reconstructed for the read pairs.

11. A non-transitory computer-readable storage medium storing the program as defined in claim 10, further causing the computer to execute:

receiving (k+α) pairs out of n pairs ($r_i$, $f_i$) each composed of a random number $r_i$ and a share $f_i$ where α is a natural number;

making the determination for all received pairs; and
outputting g(0) as the secret if the polynomial could be reconstructed, and otherwise outputting a signal indicating that at least one of the received pairs has been forged.

12. A non-transitory computer-readable storage medium storing the program as defined in claim 11, further causing the computer to execute:

repeating said receiving and said making the determination for all combinations generated by selecting (k+α) pairs out of n pairs; and outputting g(0) as the secret if values of g(0) reconstructed for all the combinations are equal, and otherwise outputting a signal indicating that at least one of the received pairs has been forged.

13. A non-transitory computer-readable storage medium storing a program that generates shares based on a (k, n) threshold secret sharing scheme and reconstructs a secret based on shares, said program causing a computer to execute:

generating a predetermined (k−1)-degree polynomial f(x) that includes the secret as a constant term; and generating and outputting n pairs ($r_i$, f($r_i$)) each composed of a random number $r_i$ and a share f($r_i$), said program further causing the computer to execute said receiving, said making the determination, and said outputting or said receiving, said making the determination, said repeating, and said outputting according to said program as defined in claim 11.

* * * * *